Sept. 19, 1961   L. GIARDINO ET AL   3,000,101
ELECTROMECHANICAL MEASURING APPARATUS
Filed April 30, 1957   2 Sheets-Sheet 1

INVENTORS
LORIS GIARDINO &
VITTORIO FAENZA
BY
ATTORNEY

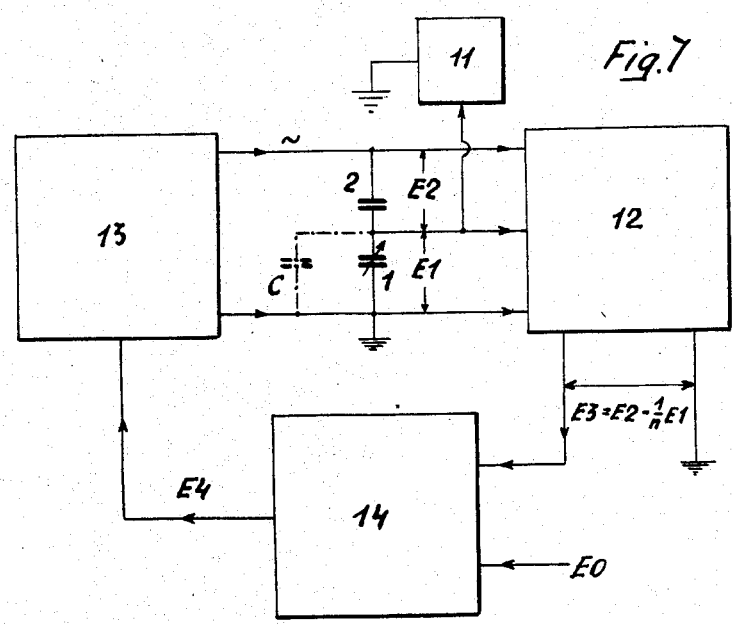
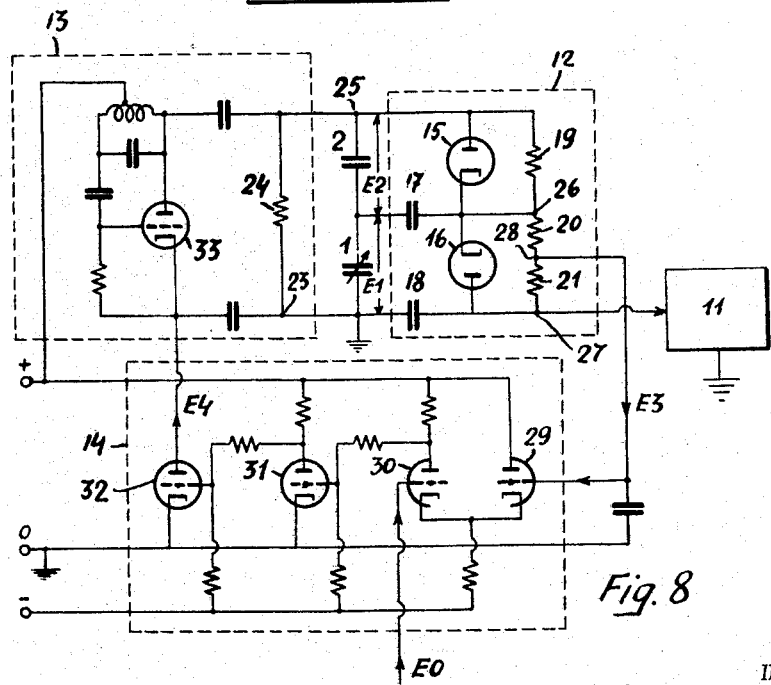

United States Patent Office  3,000,101
Patented Sept. 19, 1961

3,000,101
ELECTROMECHANICAL MEASURING APPARATUS
Loris Giardino, 6 Via G. Rossi, and Vittorio Faenza, 148 Via Mazzini, both of Bologna, Italy
Filed Apr. 30, 1957, Ser. No. 656,014
Claims priority, application Italy Apr. 30, 1956
13 Claims. (Cl. 33—143)

This invention relates to electromechanical measuring apparatus of the kind in which dimensional variations are transformed into corresponding variations of capacitance of a variable capacitor, provided with parallel plates and which is connected to a generator of alternating voltages. This variable capacitor, which is usually termed "capacitance transducer" is arranged in series with a fixed comparison capacitor, the whole being so disposed that the variations of capacitance of said transducer are translated into corresponding voltage variations, which are employed for operating measuring instruments and/or controlling devices.

In the apparatus of this kind, there is practically no linear dependence between the voltage at the terminals of the transducer and the distance between its plates, or the insulating power of the dielectric therebetween, due mainly to the fact that the total capacitance does not only comprise the value of the capacitor proper, that is the capacitance between the two facing movable capacitor plates, but also the additional capacitances between the leads connected to the plate terminals as well as the residual capacitance originating from parts which are electrically connected to the capacitor plates, or by other parasitic capacitances. This additional capacitance, which cannot be determined in advance, may be considered and represented in the drawings as a substantially fixed capacitor, connected in parallel with the capacitor plates of said transducer.

In view of the above outlined circumstances, the capacitance of said transducer is not inversely proportional to the distance between its plates or to the insulation power of the dielectric therebetween and consequently the curve representing the response to the variation of distance between the transducer plates is not a straight line, as would be necessary if the said transducer should be fitted on devices for continuously effecting a large number of precision measurements, or also for measuring a quantity by means of two independent transducers, as will be seen hereinafter.

The invention consists in employing a generator of alternating voltage which is fed to the plates of an electromechanical transducer across a fixed capacitor having the function of basis of comparison, and arranged in series with respect to the first capacitor and in which the said generator furnishes an alternating voltage which is automatically variable in such a manner that the difference between the alternating voltage at the terminals of the fixed capacitor and a determined fraction of the voltage at the transducer terminals remains constant.

According to a preferred embodiment of the invention, the voltage which is generated by the said alternating voltage generator is determined by a regulating voltage which either corresponds, or is proportional, to the difference between a fixed comparison voltage and, as subtrahend, the difference between the voltage at the terminals of the fixed comparison capacitor and a fraction of the voltage at the terminals of the said transducer.

According to a preferred arrangement, the fraction of the voltage at the terminals of the transducer which is subtracted from the voltage at the terminals of the fixed comparison capacitor may be determined in such a manner as to provide for a linear interdependence between the voltage variations at the terminals of the transducer and the variation of the distance between the transducer plates (or to the variations of the insulating power of the dielectric therebetween) which correspond to the variations of measurements to be executed.

In this connection it may be said that it is immaterial in what manner is obtained either the variation of the voltage which is generated by the alternating voltage generator, or the difference between the voltage at the terminals of the fixed comparison capacitor and the predetermined fraction of the voltage at the terminals of the transducer or also how the control voltage is obtained, which corresponds to the difference between the said voltage difference and a fixed comparison voltage.

Other objects and advantages of the invention will be apparent from the following specification and by reference to the attached drawings, in which:

FIGURE 7 is a block diagram of the arrangement according to the invention and

FIGURE 8 is a simplified circuit arrangement of a practical embodiment of the invention.

Figure 1:
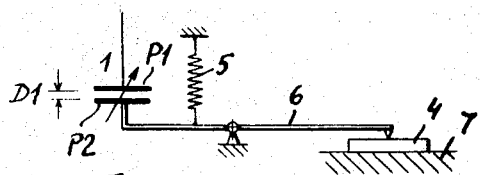
FIGURES 1 to 4 show diagrammatically and by way of example four electromechanical measuring devices or gauges which lend themselves to the employment of the basic idea according to the invention.

Generally speaking, the invention has for its object a substantial improvement of the conventional electromechanical measuring devices in which the variations of a quantity to be measured are transduced into proportional variations of the distance $D_1$ between the parallel plates $P_1$ and $P_2$ (FIGURE 5) of a variable capacitor 1, which shall be called hereinafter the "transducer," whereby said transducer 1 together with a comparison capacitor 2 arranged in series with said transducer 1 are connected to the output of an alternating voltage generator 3 so that the variations of the distance of the transducer plates are transformed into corresponding variations of the voltage at its terminals.

As it is apparent to the skilled in the art, by these means it is possible to detect the variations of any quantity by transducing same into variations of the distance $D_1$ between the transducer plates $P_1$, $P_2$. Thus, in FIGURE 1, a device is shown for controlling by means of a transducer 1 inserted in a circuit such as those shown in FIGURES 7 and 8 of the drawings (and which will be described hereinafter) which forms part of a device for measuring the usually small differences in thickness of a material 4, and for example a sheet material which should have a substantially constant thickness. The material is allowed to pass upon a supporting table 7 forming part of the measuring device which, in the example as shown comprises a balance lever 6 carrying at one end the movable plate $P_2$ of the said transducer 1 while at its other end is provided with a feeler tip, a spring 5 being provided for keeping said feeler tip in contact with the material 4. It is apparent that at each, even very small, variation of the workpiece thickness, the transducer movable plate $P_2$ is shifted towards or away from the fixed plate $P_1$ thus causing the distance $D_1$ to vary.

Figure 2:
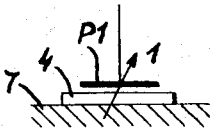

In the embodiment shown in FIGURE 2, the material 4 to be measured may be a conductive plate which is shifted on the supporting table 7, which is preferably a conductive table, under the fixed plate $P_1$ of the transducer 1, the movable plate of which is constituted by the same conductive plate 4. The same device may be employed for detecting the variations of the dielectric constant of a non-conductive material, and for example for detecting the variations of filling and/or humidity contents of a cigarette rod. In this case, of course, there is no movable capacitor plate, but the variations of the dielectric constant of a material passing between two fixed plates acts of course in like manner as if one of the plates were movable.

Figure 3:
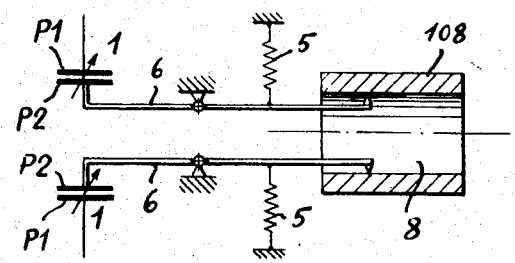

Whenever the variation in the diameter of bore 8 should be measured, it is advisable to employ a pair of transducers 1 (FIGURE 3) the movable plates $P_2$ of which are carried by feeler levers 6 or the like, of the kind shown in FIGURE 1. The independent movements of the feeler levers 6 promote corresponding variations between the transducer plates $P_1, P_2$ and thus promote variations in the voltage at the transducer terminals. The sum of these voltages furnishes a measure for the variation of diameter of the bore 8.

Figure 4:
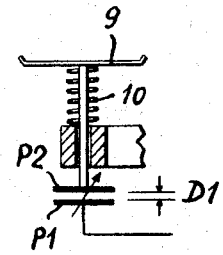

In the embodiment shown in FIGURE 4 the movable plate $P_2$ of the transducer is controlled by a movable member of a spring scale 9, 10. Thus even very small variations of weight of the articles are detected readily and may be recorded and/or they may serve for adjusting the manufacturing line of the articles being weighed, for example for regulating the control devices of a cigarette making machine.

From the foregoing it is apparent that the apparatus just described lends itself to a wide variety of applications, of which those just described and diagrammatically shown are only a few of the numerous cases which may present themselves in practice.

Figure 5:
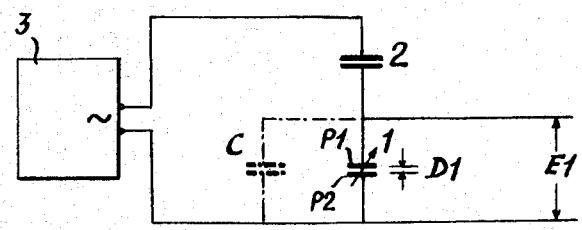
FIGURE 5 is a diagram of a conventional measuring device employing a capacitance transducer and FIGURE 6 shows by dotted lines one of the curves which may be obtained by such conventional transducer and by full line the theoretical line representing the interdependence between the distance between the plates of a variable capacitor and the voltages measured at the terminals of said capacitor.

FIGURE 5 shows a conventional arrangement for detecting and measuring the variations of capacitance of a capacitance transducer 1, adapted to be connected to a measuring device of the kind above referred to and which promotes the variations of its capacitances usually by varying the distance between the two transducer plates $P_1$ and $P_2$ or, which practically is the same, by varying the thickness and/or the quality of the dielectric interposed between the said transducer plates. In order however to simplify the following specification the variation of capacitance of this transducer will be assumed to be exclusively due to the variations of distance $D_1$ between the plates $P_1 P_2$.

As may be seen from the diagram shown in FIGURE 5, the transducer 1 is connected to an alternating voltage generator 3 at one of its terminals directly and at the other terminal across a capacitor 2, whereby the voltage variations $E_1$ at the transducer terminals are proportional to the capacitance variations of said transducer promoted by the variations of the distance $D_1$ between between the plates $P_1, P_2$.

It is to be borne in mind, however, that the total capacitance of said transducer includes also an unavoidable parasitic capacitance promoted by leakage and additional capacitances between conductive parts (leads, mass of the device). Said parasitic capacitance varies for each apparatus and may not be determined in advance but it does not substantially vary when the distance between the transducer plates is varied. This parasitic capacitance, indicated by C in FIGURE 5, where it is shown by dotted lines, modifies the total capacitance in such a manner that the voltage $E_1$, instead of being directly proportionally variable with the distance $D_1$ between the transducer plates $P_1$ and $P_2$ (line A in the diagram shown in FIGURE 6) is a non-linear function of this distance $D_1$. For this reason the corresponding voltage variations are not linear but may be represented by a curve like that shown by dotted lines and indicated by B in FIGURE 6.

Now, if this curve B would be not straightened and brought substantially to coincide with A, it would lead to great complications in the devices controlled by said voltage variations in order to take into account the deflection from the straight of the characteristic line of response of the transducer. Furthermore, in some cases such as in the device shown in FIGURE 3, in which the bore 8 of a workpiece 108 is measured by comparison of the output voltages at the terminals of two transducers, it would be practically impossible to sum the output voltages of the two devices, as the voltages at the terminals of the transducers would usually lie on different sections of the curve B and, in addition, the curves of the two simultaneously acting transducers would always show some difference between them.

The inconveniences of the known devices are eliminated by adopting a circuit arrangement like that shown in the block diagram shown in FIGURE 7. By this arrangement, an alternating voltage generator 13 is provided which is connected to the capacitance transducer 1 which has the fixed capacitor 2 arranged in series therewith, the generator 13 being such as to be capable of generating a variable alternating voltage. In order to balance the influence of the parasitic capacitance C, in parallel with the transducer 1, both the voltage $E_1$ at the terminals of the transducer 1 and the voltage $E_2$ at the terminals of the fixed capacitor 2 are fed into a circuit section 12 in which the sign of the voltage $E_1$ is reversed and a fraction $1/n$ of this voltage is added to the voltage $E_2$ of the fixed comparison capacitor 2 so that at the output of the section 12 of the device a voltage $$E_3 = E_2 - 1/nE_1$$

is delivered. The output voltage of the generator 13 is automatically varied during the operation in such a manner that the voltage difference $E_3 = E_2 - 1/nE_1$ remains constant during the operation. According to a preferred embodiment of the invention this automatic variation of the voltage generated by the generator 13 is attained by controlling the said generator by means of a voltage $E_4$ which is obtained in the differential amplifier 14. This voltage $E_4$ is the amplified difference between a fixed comparison voltage $E_0$ and the difference of voltages $$E_3 = E_2 - 1/nE_1$$

which is obtained at the output of section 12 of the device. In this manner an autoregulating closed circuit is formed, in which the effect of the parasitic capacitance is balanced by an automatic variation of the voltage generated at the output terminals of the generator 13.

Figure 6:
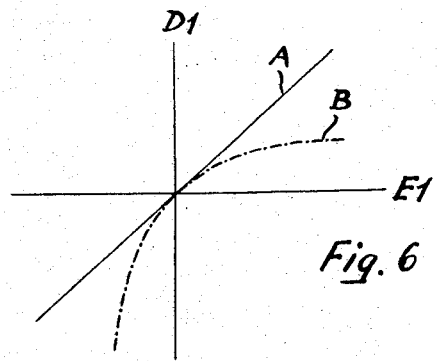

In this arrangement the fraction $1/n$ of the voltage $E_1$ which is subtracted from the voltage $E_2$ of the fixed capacitor 2 must be determined in such a manner that between the voltage $E_1$ and the variation of the capacitance of the transducer 1, which is proportional to the distance of its plates, the ratio may be represented by a substantially straight line such as that shown at A in FIGURE 6. In order to do this, the fraction $1/n$ must be equal to $C/C_2$, in which C represents the parasitic capacitance of the transducer and $C_2$ the capacitance of the fixed comparison capacitor 2. As however the capacitance C is unknown, in practice the voltage fraction $1/nE_1$ is determined experimentally by the calibrating of the measuring device.

One of the many possible practical embodiments of the arrangement shown in FIGURE 7 is particularly shown in FIGURE 8. In this arrangement, the section 12 of the device comprises a pair of rectifiers 15, 16 arranged in push-pull. The alternating voltages $E_1$ and $E_2$ at the terminals of the transducer 1 and of the comparison capacitor 2 are fed across the capacitors 17, 18 to the rectifier tubes 15, 16 and traverse the resistors 19 and 20—21, so that at the ends of these resistors two continuous voltages are formed which are proportional to the two said alternating voltages. Assuming to be at the point 23, in the alternating voltage generator, the zero point of the alternating voltages (whereby this point 23 may be grounded as shown) and by connecting this point with the other generator terminal through a resistor 24, at the terminals of the two series capacitors 1 and 2 alternating voltages are supplied, which are then transformed into corresponding continuous voltages whereby between 26 and 27, that is at the ends of the series resistor 20 and 21, a continuous voltage drop is generated, which is proportional to the alternating voltage $E_1$ at the terminals of the transducer 1. This continuous voltage is of opposite polarity to the continuous voltage across the resistor 19. On the other hand, between 26 and 28, across the resistor section 20 a voltage drop exists which is a fraction of the voltage drop between 26 and 27, that is across both resistors of the resistor section 20 and 21. Now the ratio of the resistor 20 to the resistor 21 is so chosen that the value of the voltage drop across the resistor 20 with respect to the total voltage drop through both resistors 20 and 21 equals the fraction $1/n$. In this manner the continuous voltage $E_3$ measured between the points 28 and 23 is rendered equal to the difference $E_2-1/nE_1$, between the voltage $E_2$ at the terminals of the fixed comparison capacitor 2 and a fraction $1/n$ of the voltage $E_1$ at the transducer terminals.

This continuous voltage $E_3$ which, according to the invention should be maintained constant by varying the voltage generated by the alternating voltage generator 13, is fed, together with a continuous comparison voltage $E_0$, to a differential amplifier 14 comprising the electronic tubes 29, 30, 31 and 32. The continuous voltage $E_3$ and the comparison voltage $E_0$ are fed to the grids of the double triode 29—30. The cathodes of this double triode 29—30 are connected between them and to the negative terminal of the device across a common high resistance. Thus this double triode 29—30 acts as a differential amplifier of said two voltages $E_0-E_3$. The tube 31 (triode or pentode) constitutes the second amplifying step and the tube 32 constitutes the power tube which furnishes the voltage $E_4$ that is employed for controlling the alternating voltage generator 13.

The alternating voltage generator 13 comprises an oscillator tube 33 forming part of a conventional oscillating circuit and the cathode of which is connected to the anode of the power tube 32 of the differential amplifier and thus the voltage generated by the said generator comes to be directly dependent upon the output voltage $E_4$ of the differential amplifier.

The voltage generated in the apparatus, which is proportional to the distance between the transducer plates, may be led, either as alternating voltage tapped at the transducer terminal (FIG. 7) or as continuous voltage (FIG. 8) tapped at the point 27, to a suitable gauge or to a control device or to any other suitable device, indicated as a block 11.

Although certain specific embodiments of the invention have been shown and described, it is obvious that many modifications thereof are possible. The invention, therefore, is not to be restricted except insofar as is necessitated by the prior art and by the spirit of the appended claims.

We claim:

1. An electromechanical measuring apparatus comprising a pair of feelers, a pair of variable capacitance transducers each provided with a movable plate connected to a feeler which by its shiftings promotes the variations of capacitance of the corresponding transducer, a pair of fixed capacitors, each acting as a comparison capacitance and being electrically connected with a transducer; each of said transducers and fixed capacitors being connected to a generator of alternating voltage and to apparatus for detecting and utilising the variations of voltage at the output of the electromechanical apparatus, said variations being promoted by the shifting of the movable plates of the transducers, means for automatically varying the voltage at the output of said generator of alternating voltage to automatically correct the deflections from the linearity of the voltage variations which are mainly due to parasitic capacitances of said transducers, said means causing voltage variations such that the difference between the voltage at the terminals of each of the said fixed capacitors and a predetermined fraction of the voltage at the terminals of each of the said transducers is a fixed value.

2. An electromechanical measuring apparatus according to claim 1 in which the voltage generated in said generator and applied to each of said transducers and connected fixed capacitor depends upon a control voltage whose value corresponds to the difference between a fixed comparison voltage and, as subtrahend, the difference between the voltage at the terminals of the fixed capacitor and a predetermined fraction of the voltage at the terminals of the corresponding connected transducer.

3. An electromechanical measuring apparatus according to claim 1 in which the voltage generated in said generator and applied to each of said transducers and connected fixed capacitor depends upon a control voltage whose value corresponds to the difference between a fixed comparison voltage and, as subtrahend, the difference between the voltage at the terminals of the fixed capacitor and a predetermined fraction of the voltage at the terminals of the corresponding connected transducer, said fraction corresponding to the ratio between the said parasitic capacitances acting in parallel to the said transducer and the capacitance of the fixed capacitor.

4. An electromechanical measuring apparatus according to claim 1 in which the alternating voltage generator is formed by an oscillating circuit comprising an electronic oscillator tube whereby the variations of the voltage values at the output of said generator and applied to each of said transducers and connected fixed capacitor are controlled by a variable control voltage obtained in a differential amplifier and which is fed to the cathode of said oscillator tube, the value of said control voltage corresponding to the difference between a fixed comparison voltage and, as subtrahend, the difference between the voltage at the terminals of the fixed capacitor and a predetermined fraction of the voltage at the terminals of the corresponding connected transducer.

5. In an electromechanical apparatus for measuring and checking characteristics of articles, at least one transducer comprising a variable capacitor provided with a pair of substantially parallel plates and having a space between them to be acted upon to promote the variations of capacitance of said transducer, and a fixed capacitor electrically connected to the said variable capacitor of said transducer and acting as comparison capacitance; said transducer being connected to a generator of alternating voltage and to apparatus for detecting and utilizing the variations of voltage promoted by the action between the plates of said variable capacitor; the arrangement of means for automatically correcting the voltage at the output of said generator of alternating voltage in such a manner as to automatically balance the deflections from the linearity of the voltage variations which are due mainly to parasitic capacitance of said transducer, whereby by determining the values of varying voltages obtained at the output of the said apparatus for detecting the variations of voltage of said variable capacitor, the amount of the variations of the characteristics to be measured in said articles is obtained.

6. An apparatus according to claim 5 wherein said variable capacitor is provided with parallel plates at least one of which is movable substantially normally to the parallel planes of the plates and is mechanically connected to a movable member which indicates by its shiftings the measurement to be effected.

7. An apparatus according to claim 5 wherein said variable capacitor is provided with spaced parallel plates one of which is a conductive table and between which a material having dielectric properties is shifted parallelly to said plates; the variations of the dielectric constant of said material promoting corresponding variations of capacitance of said transducer.

8. An apparatus according to claim 5 wherein said variable capacitor is provided with a conductive material-supporting table and with a capacitor plate spaced from said table in such a manner as to allow a conductive material to be measured to be shifted, in electrical contact with said conductive table parallelly to, but spaced from said capacitor plate; whereby the said material acts as a second plate of said capacitor.

9. An apparatus according to claim 5 wherein said variable capacitor is provided with parallel plates, one of which is movable substantially normally to the parallel planes of said plates and is connected to a movable member forming part of a weighing scale and whose shiftings are proportional to the weights imposed upon the scale.

10. An electromechanical measuring apparatus according to claim 5 in which the value of the voltages generated in said generator depends upon a control voltage whose value corresponds to the difference between a fixed comparison voltage and, as subtrahend, the difference between the voltage at the terminals of the said fixed capacitor and a predetermined fraction of the voltage at the terminals of the said variable capacitor.

11. An electromechanical measuring apparatus according to claim 5 in which the value of the voltages generated in said generator depends upon a control voltage whose value corresponds to the difference between a fixed comparison voltage and, as subtrahend, the difference between the voltage at the terminals of the said fixed capacitor and a predetermined fraction of the voltage at the terminals of the said variable capacitor, said fraction corresponding to the ratio between the said parasitic capacitances acting in parallel to the said transducer and the capacitance of the said fixed comparison capacitor.

12. An electromechanical measuring apparatus according to claim 5 in which the alternating voltage generator is formed by an oscillating circuit comprising an electronic oscillator tube whereby the variations of the voltage values at the output of said generator are controlled by a variable control voltage obtained in a differential amplifier and which is fed to the cathode of said oscillator tube, the value of said control voltage corresponding to the difference between a fixed comparison voltage and, as subtrahend, the difference between the voltage at the terminals of the said fixed capacitor and a predetermined fraction of the voltage at the terminals of the said variable capacitor.

13. An electromechanical apparatus for measuring and checking characteristics of articles comprising a transducer formed of a variable capacitor having a pair of substantially parallel plates separated by a space to be acted upon to cause variations of capacitance of said transducer, mechanical means for connection to the article to be measured and acting upon said space between the plates to vary the capacitance of said variable capacitor in accordance with a characteristic to be measured, a fixed capacitor electrically connected to said variable capacitor and acting as a comparison capacitance, a generator of alternating voltage connected to said variable and fixed capacitors, automatic means for varying the voltage of said generator to correct for deviation from linearity of the voltage across said variable capacitor as the voltage thereof varies with the characteristic of the article being measured due primarily to parasitic capacitances of said transducer, said automatic means varying the input to said generator so as to maintain the difference between the voltage across said fixed capacitor and a predetermined fraction of the voltage across said variable capacitor at a constant value, and means for detecting the voltage across said variable capacitor.

References Cited in the file of this patent

UNITED STATES PATENTS

| | | |
|---|---|---|
| 1,431,638 | Dowling | Oct. 10, 1922 |
| 2,514,847 | Coroniti | July 11, 1950 |
| 2,611,964 | Buisson | Sept. 30, 1952 |
| 2,656,507 | Fielden | Oct. 20, 1953 |
| 2,732,625 | Buisson | Jan. 31, 1956 |